United States Patent [19]

Sekimoto

[11] Patent Number: 5,388,007
[45] Date of Patent: Feb. 7, 1995

[54] APPARATUS FOR RECORDING AND REPRODUCING SIGNALS WHICH PROVIDES GUARD BANDS BETWEEN SETS OF RECORDING TRACKS TO IMPROVE EDITING

[75] Inventor: Kunio Sekimoto, Katano, Japan

[73] Assignee: Matsushita Electric Industrial Co., Ltd., Osaka, Japan

[21] Appl. No.: 110,678

[22] Filed: Aug. 9, 1993

Related U.S. Application Data

[63] Continuation of Ser. No. 817,979, Jan. 8, 1992, abandoned, which is a continuation of Ser. No. 477,766, Feb. 9, 1990, abandoned.

[30] Foreign Application Priority Data

Feb. 14, 1989 [JP] Japan .................................. 1-33989

[51] Int. Cl.⁶ ...................... G11B 27/02; G11B 15/14; G11B 5/03
[52] U.S. Cl. .......................... 360/13; 360/64; 360/66
[58] Field of Search ............ 360/13, 14.1, 61, 66, 360/121, 64, 22, 32, 35.1

[56] References Cited

U.S. PATENT DOCUMENTS

| | | | |
|---|---|---|---|
| 4,390,915 | 6/1983 | Matsuyama | 360/13 |
| 4,463,387 | 7/1984 | Hashimoto et al. | 360/33.1 |
| 4,527,202 | 7/1985 | Ohta | 360/18 |
| 4,539,615 | 9/1985 | Arai et al. | 360/121 |
| 4,571,641 | 2/1986 | Fujiki et al. | 360/19.1 |
| 4,636,873 | 1/1987 | Eguchi | 360/64 |
| 4,879,609 | 11/1989 | Kozuki et al. | 360/66 |
| 5,018,036 | 5/1991 | Yamashita | 360/64 |
| 5,140,473 | 8/1992 | Murakami | 360/64 |

FOREIGN PATENT DOCUMENTS 1569042 6/1980 United Kingdom .

*Primary Examiner*—Donald Hajec
*Assistant Examiner*—W. T. C. Kim
*Attorney, Agent, or Firm*—Wenderoth, Lind & Ponack

[57] ABSTRACT

A recording and reproducing apparatus includes two recording heads, two re-recording heads and one erasing head. The two recording heads are utilized to record directly adjacent recording tracks having no guard band therebetween. The adjacent recording tracks constitute a recording track set, and a plurality of such recording track sets are recorded on a recording medium such that a guard band is provided between adjacent ones of the recording track sets. The erasing head has an erasing width which is greater than a corresponding width of each recording track set, and it utilized to erase an already recording track set which was recorded using the two recording heads. The re-recording heads each have a recording width which is greater than that of each of the two recording heads, and are utilized to record newly recorded track sets in place of the already recorded track sets erased by the erasing head.

12 Claims, 6 Drawing Sheets

005,388,007

APPARATUS FOR RECORDING AND REPRODUCING SIGNALS WHICH PROVIDES GUARD BANDS BETWEEN SETS OF RECORDING TRACKS TO IMPROVE EDITING

This application is a continuation of now abandoned application Ser. No. 07/817,979, filed on Jan. 8, 1992, which is a continuation of now abandoned application Ser. No. 07/477,766 filed on Feb. 9, 1990.

BACKGROUND OF THE INVENTION

The present invention generally relates to an apparatus for recording and reproducing signals, and more particularly, to an apparatus for recording and reproducing video signals and audio signals, such as a VTR (Video Tape Recorder).

Generally, in recent years, in the video/audio signal recording and reproducing apparatus such as the VTR, the picture quality and the sound quality have been improved by converting the conventional analog recording to digital recording. In digital recording, the information content of the signals to be recorded is greater than that of analog recording.

The provision of narrower recording tracks is one benefit of digital recording. As the digital recording is different from the analog recording, the S/N does not depend upon the track width. However, one factor for determining the track width depends upon whether or not the error rate necessary for complete correction can be sufficiently obtained. That is, digital recording may result in a considerably narrowed track width as compared with analog reading, but one must consider when determining the track width the accuracy required during editing operations (insertion editing and so on). During editing, a partial track may be cut or reduced since complete continuity cannot be effected with respect to the original recording at the editing points due to a difference in the linearity between different machines or due to tracking errors. As such, it is necessary to set the track width to obtain a sufficient error rate.

As a conventional embodiment, recently disclosed is a D-2 composite digital VTR (The Journal of the Institute of Television Engineers of Japan, Vol. 42, No. 5, 1988, p. 498–p. 502) for broadcasting. In the conventional embodiment, the recording track having a width of 39 μm is composed of a pair of heads, without the provision of a guard band, having mutually different azimuth angles, so that the output may not be reduced even when track shift has occurred due to interchangeability and so on through the reproducing operation using a head which is greater in width than the recording track. In the editing operation, signals are written over top one another on the already recorded track, with no erasing head being provided (overwriting).

Track cutting and interference at the editing point resulting in the case where the editing operation is effected by overwriting as in the conventional embodiment will be discussed below.

FIG. 6 illustrates the condition where the track 2 is overwritten on the already recorded track 1 from the point An Also, the oblique lines in the tracks 1, 2 denote the azimuth angles of the respective heads. FIG. 6(a) depicts a condition Where the overwriting head is shifted to the right by the width Te. FIG. 6(b) depicts a condition where it is shifted to the left by the width Te. The track pitch is Tp.

In the case as shown in FIG. 6(a), the signal components of the width Tp are reproduced at the editing point through the reproduction using the wider heads, but the signal from the track of the width Te is mixed as an interference signal of the azimuth which is the same as that of the track immediately after the editing point. The signal of the same azimuth is not attenuated, thus resulting in interference of the normal signal. The signal from the original track Tp is equivalently reduced by this interference. Now assume that the reduction portion by the interference of the track Te is kTe ($1 < k \leq 2$). If the recorded signal is of the unit sine wave, k equals 1. As the recorded signal contains components of a wide frequency range (from a low frequency to a high frequency), k becomes 1 or between 1 and approximately 2.

The equivalent effective track width Ts1 at this time becomes as follows.

$$Ts1 = Tp - kTe \quad (1)$$

In the case shown in FIG. 6(b), the already recorded track immediately before the editing point is cut by the width Te. Accordingly, the effective width Ts2 of the track becomes as follows.

$$Ts2 = Tp - Te \quad (2)$$

The tolerance track shift amount Te at the time is such that a sufficient value is provided of the error rate in the effective track width. Assume that the effective track width is Ts, Ts2 becomes greater than Ts1 from equations (1), (2).

$$Ts = Ts1 \quad (3)$$

The width Te for satisfying the equation (3) becomes the tolerance track shift amount. From equations (1), (3), $$Te = (Tp - Ts)/k \quad (4)$$

In the conventional embodiment, the track shift amount at the editing point becomes an interference as it is. It is thus necessary to widen the normal track width more than is otherwise necessary with respect to the track shift at the editing point. This results in a lessening of the recording time per unit area of the tape, an increase in the size of the cassette housing the tape, and an increase in the operating costs. Thus, from this point of view, it is desirable to have a record format wherein the track pitch itself is made as small as possible, and wherein the tolerance value of the track shift at the editing time with respect to the track pitch is made as large as possible.

SUMMARY OF THE INVENTION

Accordingly, an object of the present invention is to provide a signal recording and reproducing apparatus for recording and reproducing signals in a recording format which is capable of retaining stability at the editing point and providing a narrower track pitch.

In accomplishing this object, according to the present invention, there is provided an apparatus for recording and reproducing signals in which include recording is effected through the provision of the guard bands among adjacent sets of tracks recorded by a set of recording heads at least in the editing point, but through the non-provision of guard bands among the respective tracks which constitute each set of tracks. Recording of the signals is carried out by the formation of the oblique tracks on the recording medium using a plurality of heads which are constructed to provide different azimuth angles among the adjacent tracks.

The present invention further effects a reproducing operation using recording heads larger in width than the already recording track.

An apparatus for recording and editing signals on a recording medium according to the present invention includes at least two recording heads, at least one erasing head, and a recording means for conveying the at least two recording heads relative to the recording medium and for causing the at least two recording heads to respectively record at least two adjacent recording tracks on the recording medium. The recording heads are positioned relative to each other such that each produces respectively different azimuth angles within the adjacent recording tracks and such that the adjacent recording tracks are directly adjacent each other with no guard band therebetween. The adjacent recording tracks constitute a recording track set. An erasing means is provided for conveying the erasing head relative to the recording medium in a path coincident with the recording track set and for causing the erasing head to erase the adjacent recording tracks of the recording track set. An erasing width of the erasing head is greater than a corresponding width of the recording track set. The recording means further includes means for recording on the recording medium a plurality of adjacent recording track sets, and for providing guard bands between the adjacent recording tracks set for at least the recording tracks set in which an editing capability thereof is desired.

Furthermore, an apparatus for recording and editing signals on a recording medium according to the present invention includes at least two recording heads, at least one erasing head, and a recording means for conveying the at least two recording heads relative to the recording medium and for causing the at least two recording heads to respectively record at least two adjacent recording tracks on the recording medium. The at least two recording heads are positioned relative to each other such that each produces respectively different azimuth angles within the adjacent recording tracks and such that the adjacent recording tracks are directly adjacent each other with no guard band therebetween. The adjacent recording tracks constitute a recording track set. An erasing means is provided for conveying the erasing head relative to the recording medium in a path coincident with the recording track set and for causing the erasing head to erase the adjacent recording tracks of the recording track set recorded on the recording medium. An erasing width of the erasing head is greater than a corresponding width of the recording track set. The recording means further includes means for recording on the recording medium a plurality of adjacent recording track sets, and for providing guard bands between the adjacent recording tracks sets for at least the recording tracks sets in which an editing capability thereof is desired. At least two rerecording heads are provided respectively associated with the at least two recording heads and each having a recording width which is larger than that of each of the at least two recording heads. A rerecording means is provided for conveying the at least two rerecording heads in a path coincident with an already recording track set which has been erased by the erasing means, and for causing the at least two rerecording heads to record newly recorded adjacent tracks which constitute a newly recorded track set.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE INVENTION

Figure 1:
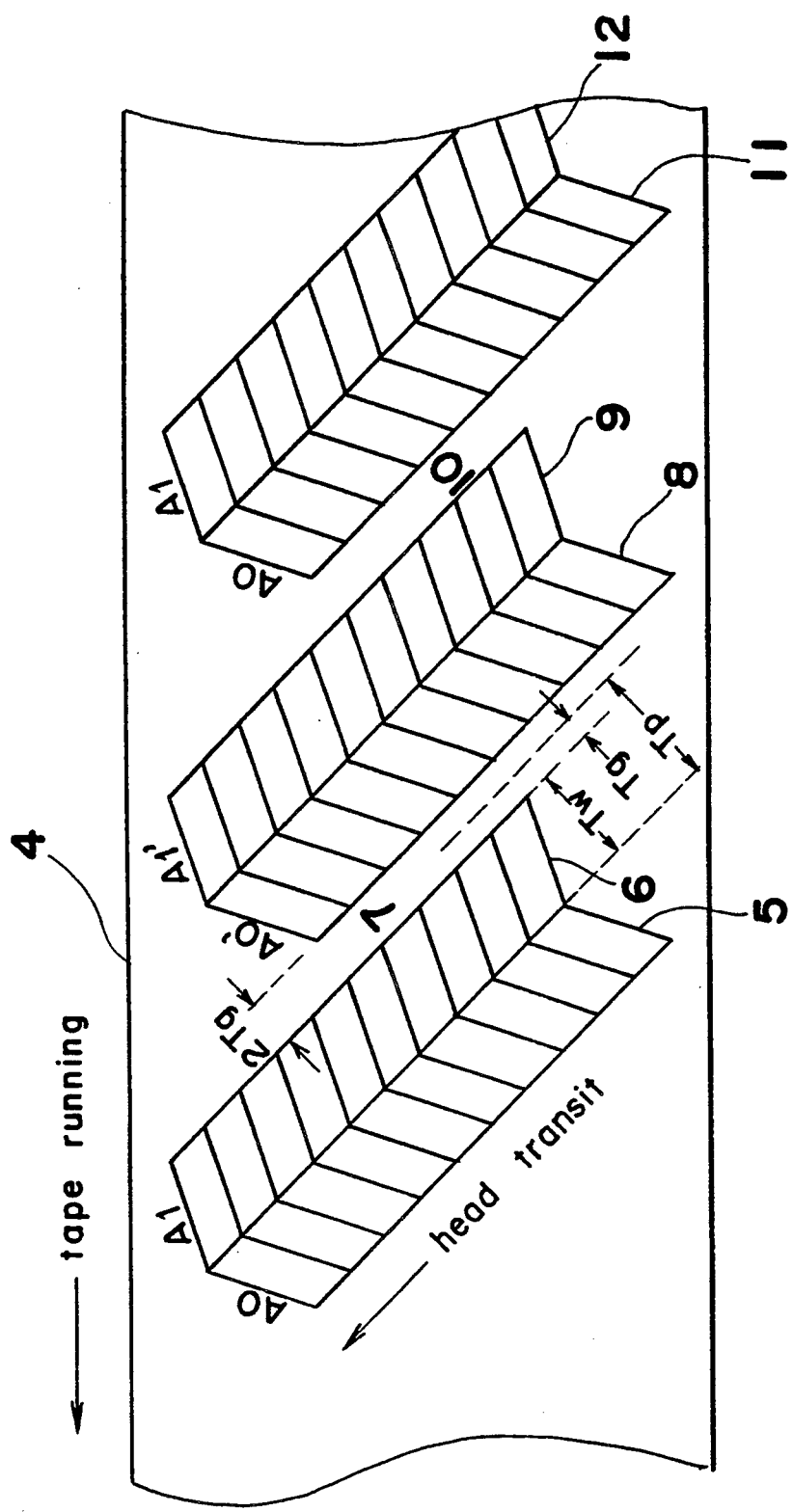
FIG. 1 is a recording pattern view showing one embodiment of a tape recording pattern in accordance with the present invention.

Before the description of the present invention proceeds, it is to be noted that like parts are designated by like reference numerals throughout the accompanying drawings.

Figure 5:
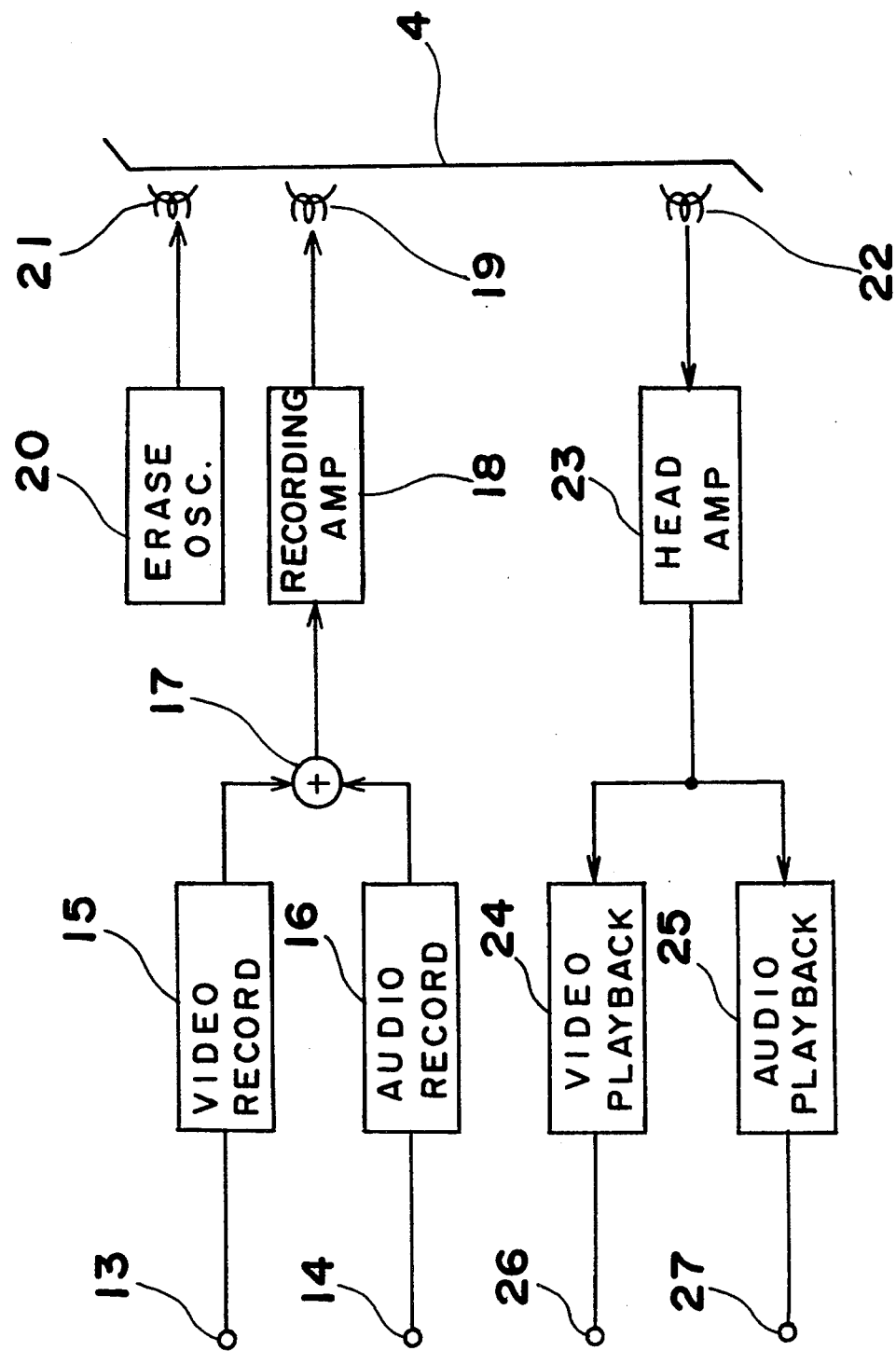
FIG. 5 is a block diagram showing an apparatus for embodying the present invention.

Referring now to the drawings, there is shown in FIG. 5 a block diagram representation of an apparatus for recording and reproducing video signals and audio signals according to one preferred embodiment of the present invention. The signals inputted into the video and audio input terminals 13, 14 are respectively processed for recording by the video signal recording processing circuit 15 and the audio signal recording processing circuit 16. The thus processed signals are added by an adder 17, and thereafter are amplified by a recording amplifier 18 and recorded on the tape 4 by the recording heads 19 (A0, A1, A0′, A1′). The signals reproduced by the reproducing heads 22 (B0, B1, B0′, B1′) during reproduction are amplified by a head amplifier 23. The thus reproduced signals are processed by a video signal reproduction processing circuit 24 and an audio signal reproduction processing circuit 25, and are then outputted on the output terminals 26, 27. During editing, the already recorded portions which are to be newly recorded are erased before the new recording operation by the erasing heads 21 (E, E′) in response to output signals of the erasing signal oscillator 20.

The recording and reproducing apparatus of the present invention will be described in detail hereinafter.

Figure 2A:
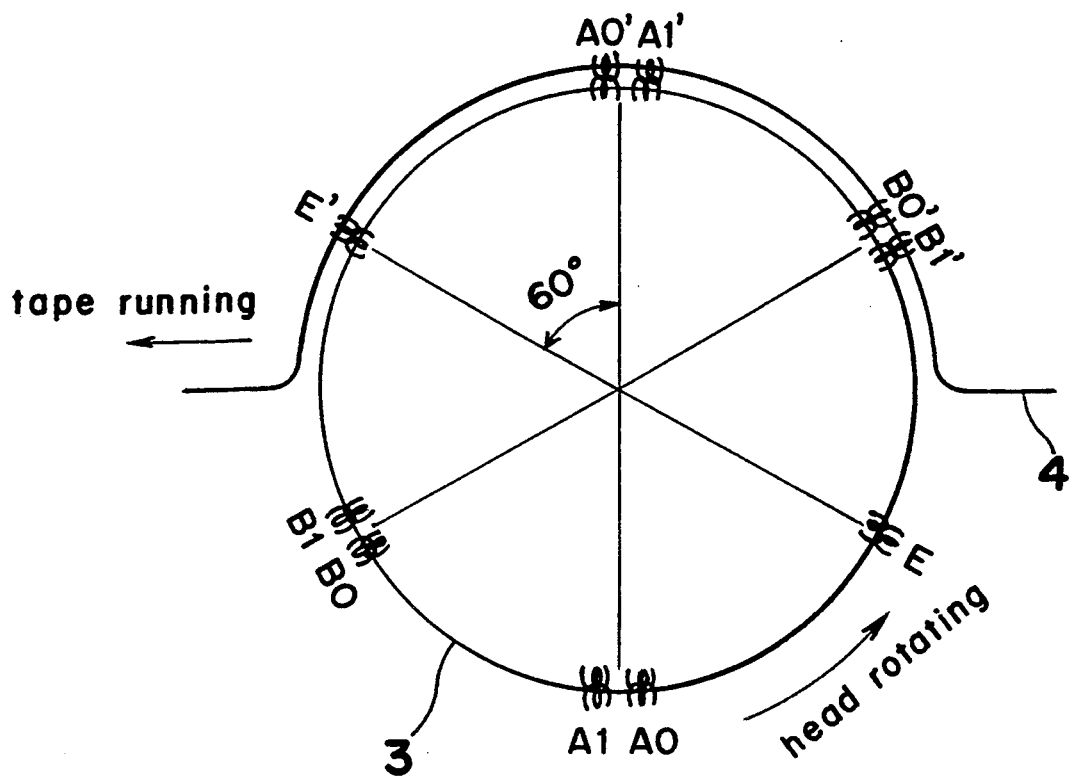
FIGS. 2(a) and (b) are views showing one embodiment of the head arrangement on a rotary cylinder in accordance with the present invention.
Figure 2B:
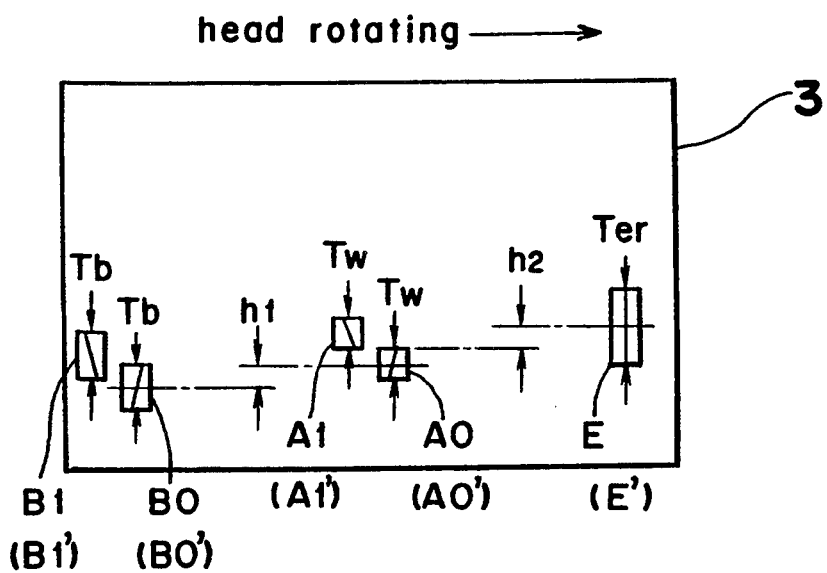
Figure 3A:
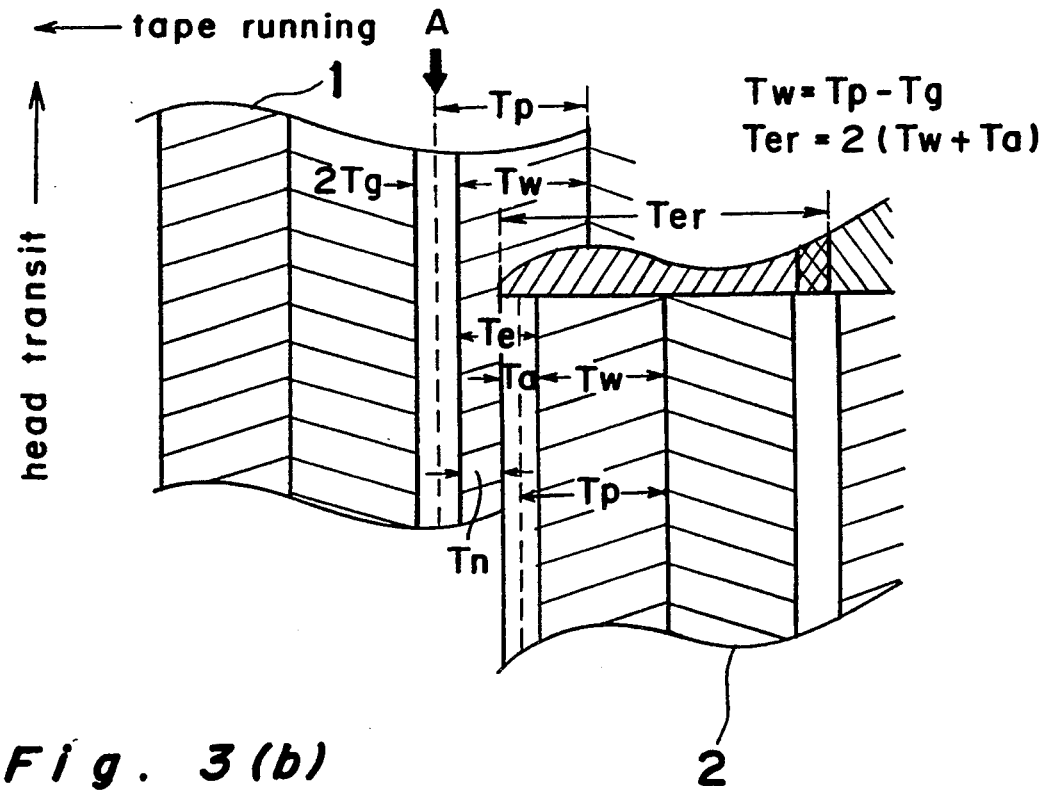
FIGS. 3(a) and (b) are track pattern views showing the relation of the tracks at the editing point in accordance with the present invention.
Figure 3B:
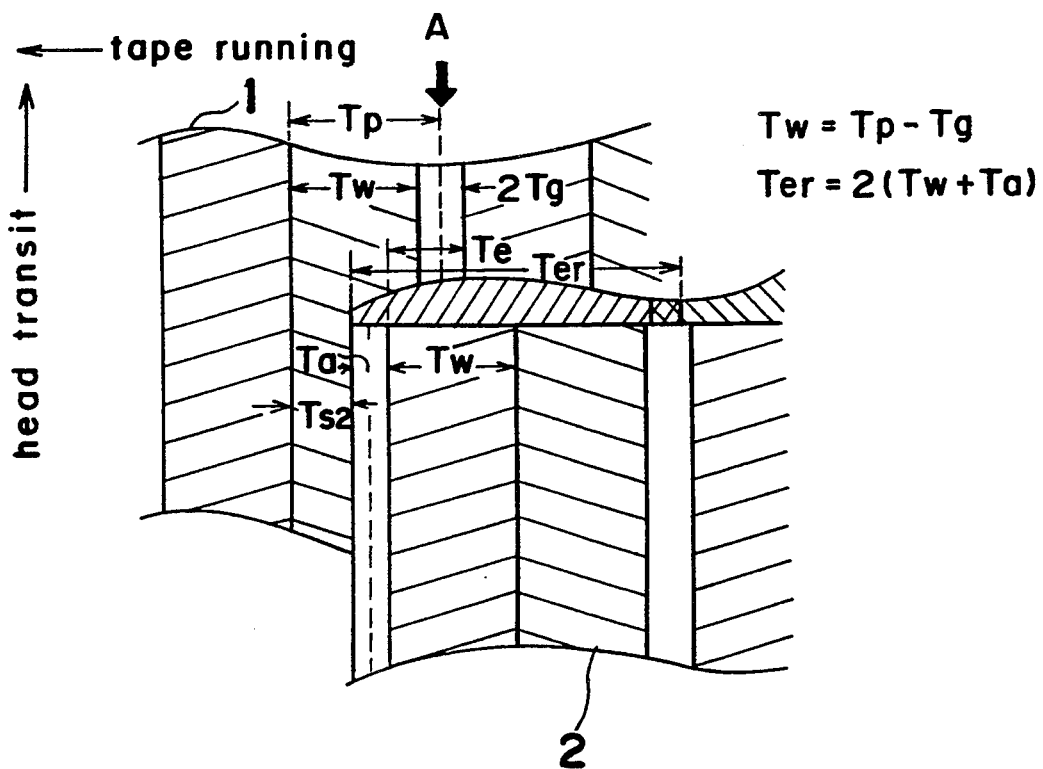

FIG. 2(a) is a plane view of a rotary cylinder 3 showing the arrangement of the respective magnetic heads and the tape winding condition. FIG. 2(b) is a front face view showing the relative position of each head. FIG. 3(a) shows recording patterns in a condition where the recording head is shifted to the right by the width Te during the editing operation, and FIG. 3(b) shows recording patterns likewise in a condition where the recording head is shifted to the left by the width Te.

As shown in FIG. 2, an erasing head E (E'), recording heads A0, A1 (A0', A1') and reproducing heads B0, B1 (B0', B1') are mounted at 60 degree intervals on the rotary cylinder 3. The recording heads A0 and A1 (A0' and A1') and the reproducing heads B0 and B1 (B0' and B1') constitute pair heads (hereinafter referred as the recording pair heads and reproducing pair heads). The recording pair heads A0 and A1 (A0' and A1') are mounted such that no gap is present therebetween in the widthwise direction as shown in FIG. 2(b). As such, no guard band therebetween is present on the recording pattern. The signals are recorded on the tape 4 by the recording pair heads A0, A1 (A0' and A1') in accordance with the rotation of the cylinder 3 so that recording track patterns as shown in FIG. 1 are formed. As shown in FIG. 1, track patterns 5, 6, 11, 12 are recorded by the recording pair heads A0, A1, and track patterns 8, 9 are recorded by the recording pair heads A0', A1'. Guard bands 7, 10 are provided between each pair of track patterns. As shown in FIG. 1, there is depicted a recording track width Tw, a track pitch Tp, and a guard band width 2Tg. The guard band width 2Tg is determined by the tape speed.

During reproduction, the reproducing operation is effected by the pair of reproducing heads B0, B1 (B0', B1') each having a width Tb which is greater than the recording track width Tw (Tb>Tw) so that the signals of each entire recording track may be normally picked up even if track shift occurs. The distance h1 shown in FIG. 2(b) denotes a height which is equivalent to the mounting angle difference (60 degrees) of the recording pair heads A0, A1, (A0', A1') and the reproducing heads B0, B1 (B0', B1'), so that the center of the reproducing head may travel along the center of the track portion just recorded by the recording head. In this manner, the recording may be confirmed through the reproduction of the reproducing head at the same time the recording is being carried out.

Additionally, the mounting positions of the reproducing pair heads B0, B1 (B0', B1') are provided in positions (in FIG. 2(b), in the upper positions) preceded by the time equivalent to the record and reproduction processing time of the signals to be recorded on the oblique tracks by the recording pair heads A0, A1 (A0', A1'), so that the signals recorded on the oblique track and the signals to be recorded on the linear track may be also set at the timing. The reproducing pair heads B0, B1 (B0', B1') are mounded on a movable element, and the position is changed at the record simultaneous reproduction time and the reproduction time, or the heads for the record simultaneous reproduction use and for the reproduction use are separately provided, so that the simultaneous reproduction and the preceding reproduction may be realized.

Each width Tb of the reproduction pair heads B0 and B1 (B0' and B1') is greater than the recording track width Tw, so that they mutually overlap at the central portions of the pair as shown in FIG. 2(b). The value of the width Tb of each of the reproduction pair heads B0 and B1 will be described later as an optimum value in consideration of the editing operation.

The track cutting and interference at the editing point according to the present invention will be described hereinafter with reference to FIG. 3. FIG. 3 depicts a condition in which the already recorded track 1 is erased from the editing point A, and the track 2 is then recorded. Also, as in FIG. 6, the oblique lines within the track depict the azimuth angles of the respective heads.

FIG. 3 (a) illustrates a condition in which the recording head is shifted to the right by a width Te, and FIG. 3(b) illustrates a condition in which the recording head is shifted to the left by a width Te.

$$Tw = Tp - Tg \quad (5)$$

$$Ter = 2(Tw + Ta) \quad (6)$$

In the equations (5) and (6), the track pitch is Tp, the recording track width is Tw, the guard band half width is Tg, the erasure width is Ter, and the difference between half the erasure width Ter and the track width Tw is Ta, which is a portion of the already recorded track erased at the editing start point. The erasure width Ter is determined by the width Ter of the erasing head E (E') shown in FIG. 2(b). The distance h2 shown in FIG. 3(b) is equivalent to the mounted angle difference (60 degrees) of the erasing head E (E') and the recording pair heads A0, A1 (A0' A1') The distance h2 is set such that a new record track is formed by the recording pair heads A0, A1 (A0', A1') at the center of the portion just erased by the erasing head E (E').

In the case as shown in FIG. 3(a), all of the signal components of the recording track width Tw at the editing point are reproduced by the wide reproducing heads B0, B1 (B0', B1') The guard band of the width Ta is formed, and the signal from the track of the width Tn (=Te−Ta, as shown in FIG. 3(a)) is mixed as an interference signal of the same azimuth. The equivalent effective track width Ts1 at this time is as follows as in the case of FIG. 6.

$$\begin{aligned} Ts &= Tw - kTn \\ &= Tp - Tg - k(Te - Ta) \end{aligned} \quad (7)$$

wherein Tn≧0, namely, Te≧Ta.

In the case as shown in FIG. 3(b), the already recorded track immediately preceding the editing point is cut by a width Te−2Tg+Ta. Therefore, the effective width Ts2 of this track is as follows.

$$\begin{aligned} Ts2 &= Tw - (Te - 2Tg + Ta) \\ &= Tp + Tg - (Te + Ta) \end{aligned} \quad (8)$$

Figure 6A:
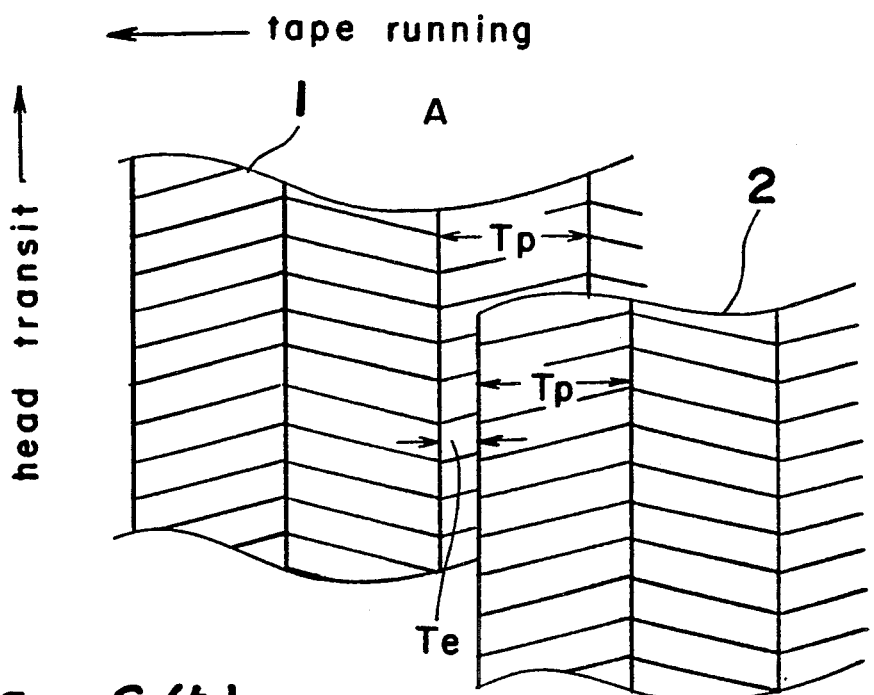
FIGS. 6(a) and 6(b) are track pattern views showing the relation of the tracks at the editing point in the conventional embodiment.
Figure 6B:
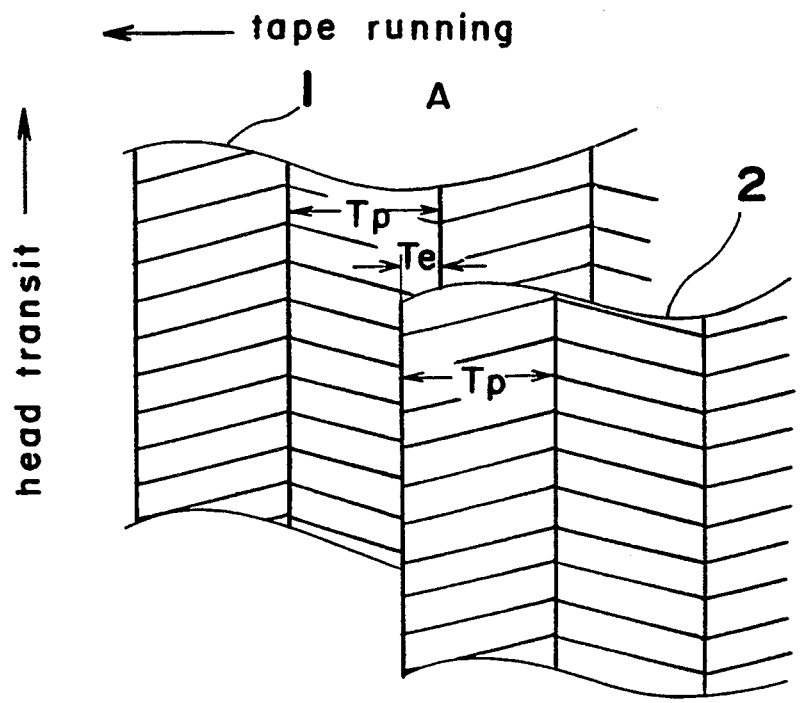

The width Te for satisfying the following equation $$Ts = Ts1 = Ts2 \quad (9)$$

becomes the tolerance track shift amount, wherein Ts is the effective track width by which the sufficient value of the error rate is provided as in the case of FIG. 6. From the equations (7), (8), (9), the following equation is provided.

$$Te = \{2/(k+1)\}(Tp - Ts) + \{(k-1)/(k+1)\}Ta \quad (10)$$

Upon comparison between the equation (4) and the equation (10), the equation 1/k<2/(k+1) is provided since k is greater than 1. The right side of the equation (4) is smaller than a first term of the right side of the equation (1). Also, a second term of the right side of the equation (1) is positive. Therefore, the tolerance track shift amount Te of the equation (10) becomes greater than the tolerance track shift amount Te of the equation (4). More specifically, in accordance with the present invention, the tolerance track shift may be made greater than that of the embodiment of FIG. 6. This means that the track pitch may be made narrower according to the present invention if the tolerance track shift is made the same. From the guard band half width Tg with respect to the tolerance track shift amount Te for satisfying the equation (10), and from the equations (5), (6), the track width Tw and the erasing width Ter are as follows.

$$Tg = \{2k/(k+1)\}Ta - \{(k-1)/(k+1)\}(Tp - Ts) \quad (11)$$

$$Tw = \{2k/(k+1)\}(Tp - Ta) - \{(k-1)/(k+1)\}Ts \quad (12)$$

$$Ter = 2\{kTp - (k-1)(Ta + Ts)\}/(k+1) \quad (13)$$

Also, as shown in FIG. 3, the reproducing head width Tb is set to pick up all of the effective signals during reproduction in the condition where tracking has been effected on the already recorded track, even if the track to be newly recorded is shifted to the right or to the left at the editing point. Therefore, the reproducing head width Tb is as follows.

$$\begin{aligned} Tb &= Tw + 2Te \\ &= \{(4 + 2k)Tp + (5 - K)Ts - 2Ta\}/(k+1) \end{aligned} \quad (14)$$

As described hereinabove, in the digital VTR, the track width is determined in relation to the error rate. A sufficient error rate may be provided by an effective track width of approximately 8 μm in a case wherein the digital VTR for recording using the pair heads is composed of two channels arranged at 180 degree intervals as in the present invention, the cylinder diameter is made to be approximately 76 mm, the rotary speed is made to be 5400 rpm which is three times the normal analog VTR, and one field is adapted to be recorded with 6 tracks. As such, the effective track width Ts equals 8 μm.

Figure 4:
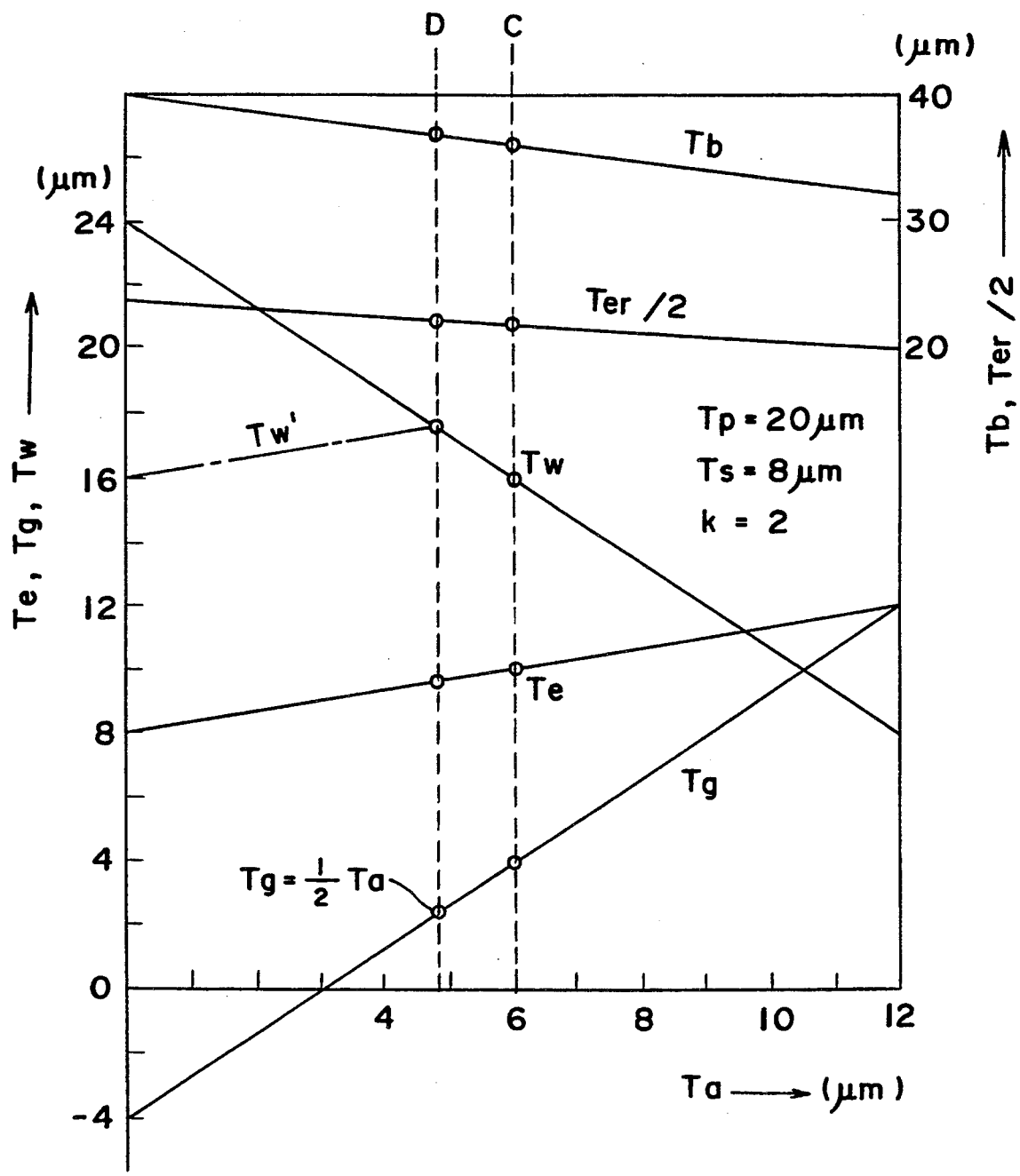
FIG. 4 is the characteristic graph showing the relation between the tolerance track shifts and the respective parameters in the present invention.

FIG. 4 shows the relation among Ta, Te, Tg, Tw, Tb and Ter, where Tp=20 μm, k=2. According to the equation (4), in the conventional case shown in FIG. 6, Te equals 6 μm under the above-described conditions. On the other hand, as shown in FIG. 4 in accordance with the present invention, Te becomes 12 μm from 8 μm when Ta is changed to 12 μm from 0. For example, where Ta=6 μm as shown by the dashed line C of FIG. 4, Te equals 10 μm, Tg equals 4 μm, Tw equals 16 μm, Tb equals 36 μm, and Ter equals 44 μm. As compared with the conventional case of FIG. 6, the track shift tolerance may be substantially increased. Also, to obtain a track shift tolerance value of 10 μm in the conventional embodiment of FIG. 6, the track pitch Tp would equal 28 μm from the equation (4), and the tape consumed would be 1.4 times that as compared with the present invention.

In FIG. 4, the dashed line D denotes a point where the guard band half width Tg equals (½) Ta. By setting the values as shown along line D, erasure is performed up to the guard band of the already recorded track when track shift has not occurred. At this time, Ta equals 4.8 μm, Tg equals 2.4 μm, Te equals 9.6 μm, Tw equals 17.6 μm, Tb equals 36.8 μm, and Ter equals 44.8 μm. On the left hand side of line D, the erasure width Ter becomes wider than 2(Tg+Tw) whereby one portion (the tracks of the recording heads A1, A1') of the track recorded is erased at the editing recording time. The width Tw' of the remaining track width of the recording heads A1, A1' is expressed by $$Tw' = Tp + Tg - Ta \quad (15)$$

and is shown by a dot-dashed line in FIG. 4. In the range of Tg≦0 (Ta≦3 μm), the track width Tw is as much as the track pitch Tp or larger than the track pitch Tp, the track width of the recording heads A1, A1' is shown line as described hereinabove. Even in this case, when the recording is effected while the erasure is performed, the tracks of the recording heads A1, A1' are partially erased, and a recording pattern having guard bands is formed.

In FIG. 4, when the erasing operation of the erasing head E (E'), if it is on the left of the line D, is effected preceded by one pair of tracks or more, not immediately before the recording by the recording pair heads A0, A1 (A0', A1'), at the guard bands of at least Ta are formed only at the editing starting point and the completing point without the partial erasure of the track recorded at the editing time. Thus, except for the editing point, the pattern having the track width Tw is formed (while Tg≧0). Especially when Tg≦0, the guard bands are formed only at the editing points (editing starting point and completing point). If it is performed in this manner, the operation in the editing point is completely the same as that as described above, thus ensuring stability.

In addition to the above-described method, as a method of forming the guard band only at the editing point, there is a method of effecting the operation only at the editing point and the completing point although the erasing operation is performed immediately before the recording operation, and further, as a method of effecting the erasing operation, there is a method of erasing only the place to become the guard band, with the width of the erasing head being Ta, and the other method. The operation at the editing point is the same in any case.

In the head arrangement shown in FIG. 2(b), the width of the recording head A0 (A0') is made upwardly wider so that overlapping may be provided between the pair heads although the boundary line between the recording heads A0 (A0') and A1 (A1') is made the same in height. In this case, the large width portion of the track by the recording head A0 (A0') to be previously recorded within the pair tracks is erased by the recording through the succeeding recording head A1 (A1'), so that the recording pattern shown in FIG. 1 may be formed all the same. In this manner, the accuracy of the head width may be lessened, and the yield may be improved.

Although in the above description, the width of each head has been described as the optimum value for maximizing the track shift tolerance value, an object of increasing the tolerance with respect to the track shift as compared with the conventional system so as to make the density higher when it can answer the purpose of the present invention if it is not a numeral value which retains this relation.

The configuration of the sets of heads is not limited to two as described hereinabove. It is clear that the ratio of the guard bands is reduced and the density may be made higher as the construction is made with more heads.

Also, in accordance with the editing of the present invention, when the new signal is recorded after the already recorded track has been erased, the old signal is completely erased, with an advantage even at the point of the error rate as compared with a thing being overwritten (the old signal remains without being completely erased) as in the system of FIG. 6. This is because the effective signal becomes larger if the track width is the same, and further the track shift tolerance value has been increased.

Since the present invention does not have the guard band provided between the pair heads, the density may be made higher as compared with the guard bands formed among all the tracks as in the conventional analog VTR.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. An apparatus for recording signals through forming oblique tracks on a recording medium with at least one rotating set of a plurality of simultaneously scanning recording heads which each are adapted to have different azimuth angles among the adjacent tracks formed by each of the heads of said set, the heads of the set being arranged such that guard bands are not formed among the respective tracks formed by a pair of the recording heads of said set,
   characterized in that guard bands are provided between the tracks formed by the different pairs of the recording heads of said set, and
   characterized in that at least one rotating erase head rotating simultaneously with the set of recording heads is provided, the erase head being arranged with respect to said set of recording heads, such that portions of the already recorded tracks larger in width than the set tracks to be formed by the set of recording heads become erased and guard bands are provided in the editing points between a set of tracks to be recorded newly by the set of recording heads and an already recorded set of tracks left unerased by said erase head.

2. An apparatus in accordance with claim 1,
   characterized by at least one rotating set of a plurality of simultaneously reproducing heads having a width larger than the recorded tracks for effecting a reproducing operation.

3. An apparatus in accordance with claim 2,
   characterized in that said erase head is arranged with respect to said set of recording heads such that at the editing time, the already recorded set of tracks at least immediately before the set tracks to be newly recorded with the recording set heads are erased at the edition starting point and completing point.

4. An apparatus in accordance with claim 2,
   characterized in that said erase head is arranged with respect to said set of recording heads such that at the editing time, the already recorded set of tracks which are erased precede the tracks newly recorded by said set of recording heads by at least one pair of tracks.

5. An apparatus in accordance with claim 1,
   characterized in that said erase head is arranged with respect to said set of recording heads such that at the editing time, the already recorded set of tracks at least immediately before the set tracks to be newly recorded with the recording set heads are erased at the edition starting point and completing point.

6. An apparatus in accordance with claim 1,
   characterized in that said erase head is arranged with respect to said set of recording heads such that at the editing time, the already recorded set of tracks which are erased precede the tracks newly recorded by said set of recording heads by at least one pair of tracks.

7. An apparatus for recording signals through forming oblique tracks on a recording medium with at least one rotating set of a plurality of simultaneously scanning recording heads which each are adapted to have different azimuth angles among the adjacent tracks formed by each of the heads of said set, the heads of the set being arranged such that guard bands are not formed among the respective tracks formed by a pair of the recording heads of said set,
   characterized in that at least one rotating erase head rotating simultaneously with the set of recording heads is provided, the erase head being arranged with respect to said set of recording heads, such that portions of the already recorded tracks larger in width than the set tracks to be formed by the set of recording heads become erased and guard bands are provided in the editing points between a set of tracks to be recorded newly by the set of recording heads and an already recorded set of tracks left unerased by said erase head.

8. An apparatus in accordance with claim 7,
   characterized by at least one rotating set of a plurality of simultaneously reproducing heads having a width larger than the recorded tracks for effecting a reproducing operation.

9. An apparatus in accordance with claim 8,
   characterized in that said erase head is arranged with respect to said set of recording heads such that at the editing time, the already recorded set of tracks at least immediately before the set tracks to be newly recorded with the recording set heads are erased at the edition starting point and completing point.

10. An apparatus in accordance with claim 8,
    characterized in that said erase head is arranged with respect to said set of recording heads such that at the editing time, the already recorded set of tracks which are erased precede the tracks newly recorded by said set of recording heads by at least one pair of tracks.

11. An apparatus in accordance with claim 7,
    characterized in that said erase head is arranged with respect to said set of recording heads such that at the editing time, the already recorded set of tracks at least immediately before the set tracks to be newly recorded with the recording set heads are erased at the edition starting point and completing point.

12. An apparatus in accordance with claim 7,
    characterized in that said erase head is arranged with respect to said set of recording heads such that at the editing time, the already recorded set of tracks which are erased precede the tracks newly recorded by said set of recording heads by at least one pair of tracks.

* * * * *